US006488720B2

(12) United States Patent
Sakamoto et al.

(10) Patent No.: US 6,488,720 B2
(45) Date of Patent: *Dec. 3, 2002

(54) ANODE MATERIAL FOR NON-AQUEOUS LITHIUM SECONDARY BATTERIES, A METHOD FOR THE PRODUCTION THEREOF, AND BATTERIES USING SUCH ANODE MATERIALS

(75) Inventors: Hitoshi Sakamoto, Tukuba (JP); Koichi Kanno, Tukuba (JP); Yuzuru Takahasi, Tukuba (JP)

(73) Assignee: Mitsubishi Gas Chemical Company, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,505

(22) Filed: Nov. 25, 1998

(65) Prior Publication Data

US 2001/0012587 A1 Aug. 9, 2001

(51) Int. Cl.$^7$ .............................. H01M 4/60; H01M 6/00
(52) U.S. Cl. ..................................... 29/623.1; 429/231.8
(58) Field of Search ....................... 429/231.8; 29/623.1

(56) References Cited

U.S. PATENT DOCUMENTS

| 4,725,422 | A | * | 2/1988 | Miyabayashi et al. ...... 423/445 |
| 5,093,216 | A | * | 3/1992 | Azuma et al. |
| 5,501,729 | A | * | 3/1996 | Lewis et al. ................. 106/274 |
| 5,698,341 | A | * | 12/1997 | Tamaki et al. ........... 429/231.8 |
| 5,721,071 | A | * | 2/1998 | Sonobe et al. ........... 429/231.8 |

OTHER PUBLICATIONS

Hawley's Condensed Chemical Dictionary, 11th ed., p. 290, No Month, 1987.*
Hawley's Condensed Chemical Dictionary, 11th ed., p. 806, No Month, 1987.*

* cited by examiner

Primary Examiner—Carol Chaney
Assistant Examiner—Tracy Dove
(74) Attorney, Agent, or Firm—Leydig, Voit & Mayer, Ltd.

(57) ABSTRACT

A carbonaceous material for use as an anode material in secondary batteries using non-aqueous solvent comprises a material obtained by calcining a solid, the solid, in turn, being obtained by heating tar and/or pitch with furfural in the presence of an acid catalyst, the use of the resulting anode material imparting to the battery a relatively large capacity while having only a small irreversible capacity loss in the first cycle.

10 Claims, No Drawings

ANODE MATERIAL FOR NON-AQUEOUS LITHIUM SECONDARY BATTERIES, A METHOD FOR THE PRODUCTION THEREOF, AND BATTERIES USING SUCH ANODE MATERIALS

BACKGROUND OF THE INVENTION

1. Field of the Invention

The present invention relates to an anode material for non-aqueous lithium secondary batteries having a large capacity and a small irreversible capacity loss, a method for the production thereof, and to batteries using such anode materials.

2. Description of the Related Arts

Non-Aqueous Lithium Secondary Batteries using carbonaceous materials as the anode as lithium secondary batteries have already been put into use because of the advantages of high energy density, small size and weight and the ability to hold a charge for a long period of time. However, the new increase in charge capacity of the anode use carbonaceous materials is inadequate to accommodate the trends in miniaturization of electrical devices and the lengthening of their period of operation without recharging.

Up until now, as the carbonaceous material used in the anodes of lithium ion secondary batteries, non-graphite type carbonaceous material with a capacity of nearly 500 mAh/g, greatly surpassing graphite materials having a capacity of 370 mAh/g have been reported. For example, materials made by calcining the reaction products of pitch or tar type compounds that have been reacted with nitrocompounds (Japanese Laid Open Patent Application Hei4-258479 [1993]), air oxidation and calcination of the reaction products of pitch or tar type compounds that have been reacted with nitric acid (Japanese Laid Open Patent Application Hei7-320740 [1995]), the calcination of palm shell charcoal at reduced pressures (Japanese Laid Open Patent Application Hei8-64207 [1996]), and materials made by improving pitch obtained by such methods as polymerization of conjugated polycyclic hydrocarbons followed by stabilization and calcination (Japanese Laid Open Patent Application Hei10-083814 [1998]), may be mentioned.

However, the materials made to date have had problems in connection with, in particular, charge and discharge efficiencies, economy, and stability of raw materials and the like. Moreover, materials having a high discharge capacity exceeding 600 mAh/g made by calcining coke at low temperatures or a polyacene made by calcining a phenolic resin (Yada et al.: Abstracts of the 34$^{th}$ Battery Symposium in Japan, p 63, 1993) have been discovered, but the excessive size of the irreversible capacity (the difference in charge capacity and discharge capacity in the first cycle) is a problem. In addition, because the discharge potential is high, there is also the problem that, when assembled with the cathode material to make a battery, the average voltage of that battery is low.

U.S. Pat. No. 5,093,216 to Azuma et al. discloses the use of furfural or a copolymer of furfural with another aldehyde, and an anode material is then prepared from that polymer. While a high initial battery capacity may be exhibited, the irreversible capacity loss of this material in the first cycle was observed to be excessive, equaling as much as one-third of total initial capacity.

SUMMARY OF THE INVENTION

As explained above, when the lithium secondary batteries using a non-aqueous solvent incorporate as the anode material the carbonaceous materials of the prior art, the capacity that can be obtained as a characteristic of those materials is not adequate. The present invention provides an anode use carbonaceous material that overcomes the difficulties of the prior art, possesses a high capacity of 500 mAh/g or more, reduces the irreversible capacity loss of the anode use carbonaceous material occurring in the first cycle, and when assembled with the cathode material to make a secondary battery, results in a battery with a high average voltage.

The inventors of the present invention, based upon the results of earnest investigations of high capacity carbonaceous material for anode use using tar or pitch as a raw material, have succeeded in discovering that the carbonaceous material prepared by calcining at 800° C. or more the solid obtained by heating pitch and/or tar and furfural in the presence of an acid catalyst differs from that made using tar, pitch or furfural alone and thereby have discovered an anode material possessing superior characteristics for a secondary battery using a non-aqueous solution.

That is to say, the present invention relates to a carbonaceous material for use in the anode of a secondary battery using an aqueous solvent characterized by calcining at a temperature of at 800° C. or more of a solid obtained by heating tar and/or pitch with furfural in the presence of an acid catalyst and to a method for making an anode material for use in the anodes of secondary batteries using non-aqueous solvents characterized by calcination at a temperature of at 800° C. or more of a solid obtained by heating tar and/or pitch with furfural in the presence of an acid catalyst, and to batteries using such anode materials.

DESCRIPTION OF THE PREFERRED EMBODIMENT

The anode material for use in a secondary battery using a non-aqueous solvent of the present invention is prepared by mixing tar and/or pitch and furfural and heating them in the presence of an acid catalyst and then calcining the solid thus obtained at a temperature of at 800° C. or more. By heating furfural in the presence of an acid, a ring-opening reaction accompanied by three-dimensional polymerization are accomplished, and a stabilized insoluble solid results. The furfural in the present invention, because it is a superior solvent for aromatic compounds, plays the role of dissolving all or the largest part of the tar or pitch which are mixtures of every type of aromatic compound. As a result, by adding an acid catalyst to this mixture and heating, a solid copolymerized product from furfural and aromatic compounds that make up tar and/or pitch is obtained. Accordingly, depending upon the type, composition, and mixing ratio and the like of the tar and/or pitch mixed with the furfural, it is possible to bring about the optimization of the properties of the material obtained. This kind of battery material, mixed from furfural and pitch-like materials, solidified by a catalyst and calcined has not been reported to date and represents an entirely new material and production method. As is well known, furfural may be polymerized by reaction with phenol and an alkali catalyst and then heat cured to provide furfural resin. Such heat-cured furfural resins are presently available, but are completely different in characteristics from the material and method of the present invention.

As the tar of the present invention, any of the many known tars may be used. Exemplary tars include such petroleum-type tars as the oil residue of the thermal decomposition of naphtha (ethylene bottom oil), petroleum heavy oil and the oil residue of low pressure cracking of light oils; coal-type tars such as those produced as a byproduct of the distillation of coal, synthetic tars obtained by polymerizing polycyclic hydrocarbons or substances containing polycyclic hydrocarbons in the presence of a Lewis acid such as hydrogen fluoride/boron tri-fluoride or aluminum chloride; and the low molecular weight fraction of synthetic pitch. In particular, the oil remaining as a by-product of the distillation of naphtha (ethylene bottoms) is used optimally as a raw material because of the high capacity that may be obtained.

As the pitch of the present invention, pitches of the type obtained from petroleum heavy oil, the oil residue of low pressure cracking of light oils, pitch produced as a byproduct of thermal decomposition of naphtha, pitches produced from coal tar raw materials, or synthetic pitches obtained by polymerizing polycyclic hydrocarbons or substances containing polycyclic hydrocarbons in the presence of a Lewis acid such as hydrogen fluoride/boron tri-fluoride or aluminum chloride and the like, may be used.

Because the carbonaceous material of the present invention are classed among the non-graphitic carbons, as the pitch used, optically isotropic pitch is optimal because of the high capacity achievable. As the isotropic pitch of the present invention, if that pitch is placed in epoxy and polished, and the polished face is viewed under a polarizing microscope, virtually the entire surface will be isotropic. However, as stated before, it is possible to control the properties of the carbonaceous material finally obtained by varying the ratio of pitch to furfural in the mixture, and even if anisotropic pitch is used as the raw material, if more furfural is used than in the case of the use of isotropic pitch, a high capacity can be obtained.

In addition, pitch obtained by polymerization of polycyclic hydrocarbons, or substances containing them, in the presence of hydrofluoric acid/boron trifluoride is preferably used because there are few impurities and product quality is stable. As the polycyclic hydrocarbons of the present invention, polycyclic hydrocarbons such as naphthalene, anthracene, pyrene, coronene and the like and their derivatives; benzofuran, quinoline, thianaphthene, silanapthene or their derivatives, or compounds made by cross-linking any of these compounds with any of the others, various petroleum distillate fractions comprising these compounds; oil residues from petrochemical processes; and coal tar distillate fractions may be given as examples.

The method of synthesizing optically isotropic pitch from polycyclic hydrocarbons in the presence of hydrofluoric acid/boron tri-fluoride is not particularly subject to limitation, however, the amount of catalyst usually used for polycyclic hydrocarbons is about 0.1 to 10 moles hydrofluoric acid per mole of polycyclic hydrocarbon and about 0.01 to 1.0 moles boron tri-fluoride per mole of polycyclic hydrocarbon, and the reaction is conducted at a temperature of between 0° C. and 300° C., preferably between 40° C. and 200° C. and more preferably between 60° C. and 170° C. Moreover, when the pitch thus obtained is treated by heating, distillation, solvent extraction, air blowing, addition of nitric acid, or addition of sulfur and the like, various types of pitch can be prepared.

When tar is used as a raw material of the present invention, a solid is obtained by heating 10 parts by weight of tar with between 0.1 and 1000 parts by weight of furfural in the presence of an acid catalyst. The ratio of tar to furfural is preferably 10 parts by weight of tar to between 1 and 100 parts by weight of furfural.

When isotropic pitch is used as a raw material of the present invention, a solid is obtained by heating 10 parts by weight of isotropic pitch with between 0.1 and 1000 parts by weight of furfural in the presence of an acid catalyst. The ratio of isotropic pitch to furfural is preferably 10 parts by weight of isotropic pitch to between 5 and 100 parts by weight of furfural.

When anisotropic pitch is used as a raw material of the present invention, a solid is obtained by heating 10 parts by weight of anisotropic pitch with between 0.2 and 1000 parts by weight of furfural in the presence of an acid catalyst. The ratio of anisotropic pitch to furfural is preferably 10 parts by weight of anisotropic pitch to between 5 and 100 parts by weight of furfural.

Next, the tar or pitch is mixed with furfural, and because furfural is a liquid at room temperature and has the ability to dissolve tar or pitch, the tar or pitch and furfural are mixed evenly at a temperature in the range of between room temperature and 150° C. The method for mixing is not particularly limited, and a batch-type vessel or a continuous kneader/extruder or the like may be used.

As the catalyst to be used to obtain a solid from the mixture of tar and/or pitch and furfural, toluenesulfonic acid, xylenesulfonic acid, sulfuric acid, nitric acid, phenolic boron tri-fluoride and amine complexes and the like may be used. The amount of catalyst that may be added is not particularly limited. However, as an illustrative range, for one hundred parts by weight of the tar or pitch and furfural mixture, a catalyst level of between 0.1 and 50 wt.% is preferred; and, for toluenesulfonic acid, an amount of from about 1 to 20 wt.% is preferred.

The solidification reaction is usually carried out at atmospheric pressure and at a temperature in the range of between room temperature and 200° C. This temperature range is preferably between 30° C. and 160° C.; and, in this regard, if the temperature exceeds about 200° C. the boiling of the furfural becomes violent so that it becomes difficult to control the solidification reaction. However, under elevated pressures, this limitation is not applicable. The method for carrying out hardening on an industrial scale is not particularly limited, and batch style or continuous reaction style equipment may be optimally employed. The hardening reaction together accelerates with a rise in temperature, and a stabilized solid is obtained. When the solid is prepared by batch production methods, it is necessary to have a means for removing the product from the reactor.

As an illustrative example of carrying out the method of this invention, first tar or pitch and furfural, together with catalyst, are placed in a metal pot and mixed at low temperature. The resulting mixture is then hardened at a temperature of around 100° C. After that, by completing hardening at 150° C. or more, and preferably 300° C. or more, the mixture shrinks into a solid. It is then possible to remove this solid from a simple pot. Because the hardening reaction is exothermic, it is possible to be sure that complete hardening has occurred all the way to the center of the solid.

Moreover, when a vessel-type reactor is used, by adding an appropriate solvent which solubilizes the raw materials, such as chloroform or benzene or the like, the solid can be obtained as a slurry. In this case, using an autoclave that is suitable for elevated pressures, the yield of the solid thus obtained can be increased. Moreover, as the equipment for continuous operation of the hardening reaction, kneader-extruder type devices, and piper reactors, such as static mixers, can be used. By controlling he reaction temperature and the length of reflux time, it is possible to continuously output material just on the point of hardening and where a slight amount of plasticity remains. After that, the reaction can be completed by high temperature treatment to obtain a fully solidified product.

As stated above, after hardening, the material is heated to between 150° C. and 800° C., which together with driving off any remaining unreacted furfural, completes the hardening reaction which is desirable for this invention. During this procedure, the atmosphere is usually a non-oxidizing gas; but, depending upon the situation, after heating the solid to a temperature range of from about 200° C. to 300° C. under an atmosphere of an oxidizing gas such as air, the solid may be heat treated at 300° C. or more under an atmosphere of non-oxidizing gas.

By calcining the organic compound raw material thus obtained under vacuum or a non-oxidizing gas, the carbonaceous material of the present invention can be obtained. The calcination temperature is generally between 800° C. and 1800° C. and, preferably, between 1000° C. and 1300° C. Suitable calcination times are between about 1 and 50 hours . Preferably, and from these conditions, optional conditions should be selected for each case. Moreover, it is also possible to conduct a pre-calcination at temperatures of less than 800° C. As the non-oxidizing gas, nitrogen or argon are preferred. The non-oxidizing gas is supplied in a continuous flow, and a method whereby the gas produced by the calcination of the organic compound raw material is carried away together with this gas flow or the exhaust generated by maintaining the vacuum, as the case may be, may be optimally employed.

The carbonaceous material for use in the anode of a secondary battery using a non-aqueous solvent of the present invention has excellent characteristics and, in particular, a discharge capacity of 500 mAh/g or more at a voltage of 0 to 1.5 using a metallic lithium counter-electrode. together with a very small irreversible capacity loss in the first cycle being perhaps the most important characteristic.

The following Examples are illustrative of the present invention. However, these Examples are only for the purpose of exemplifying the present invention and in no way should be considered to limit the form, scope or application of the present invention.

EXAMPLE 1

Fifteen grams of ethylene bottom oil and 15 grams of furfural (mixing ratio 50/50) were placed in a 200 ml glass flask and, after blending evenly by stirring at 60° C. for 1 hour, 1.5 grams of paratoluenesulfonic acid were added and mixed thoroughly. The temperature was raised to 80° C. and stirring was continued for 5 minutes until the mixture hardened into a gel. Then, the temperature was raised to 450° C. under a flow of nitrogen gas and unreacted furfural was removed with the waste gas. The processed material thus obtained was ground to an average particle diameter of 15 μm; and, then, while passing a small flow of nitrogen gas over it, the pressure was reduced to 10 torr and it was calcined at 1200° C. for 2 hours to obtain a carbonaceous material in powder form.

To 90 parts by weight of the material thus obtained was added 10 parts by weight of polyfluorinated vinylidene powder (binder) and dimethylformamide as a solvent for blending and mixing. Then, the resulting paste was coated onto a copper mesh which, after drying was cut into squares 1 cm on a side which served as test electrodes. Then, a half cell was used having $LiClO_4$ dissolved in a solution of ethylene carbonate/dimethylcarbonate/diethylcarbonate mixed in a ratio of 1/0.5/0.5 ($LiClO_4$ concentration was 1.0 mole per ) as the electrolyte and a porous membrane of polypropylene having a thickness of 50 μm as the separator. As the counter electrode of this half cell, a lithium metal disk having a diameter of 16 mm and a 0.5 mm thickness was used. Moreover, as the reference electrode, a lithium metal disk similar to the counter electrode was used.

Charging was conducted at a current density of 2 $mA/cm^2$ until the potential of the test electrode was 1 V with respect to the reference electrode and then continued to charge for 20 hours at a potential of 1 V. Next, constant current discharging was conducted at a current density of 1 $mA/cm^2$ until the potential of the test electrode reached 1.5 V with respect to the reference electrode, and the charge capacity, discharge capacity and irreversible capacity loss were determined. The conditions of preparation and the results are represented in Table 1.

EXAMPLES 2–5

The ethylene bottom oil and furfural raw materials of Example 1 were mixed in ratios of 20/80, 30/70, 40/60, and 60/40 and then subjected to the identical procedures and conditions as in Example 1. Then, half cells made with the resulting anode material were evaluated in the same way as in Example 1. The conditions of preparation and the results are given in Table 1.

EXAMPLE 6

Into a heat resistant autoclave, 7 moles of naphthalene, 2.45 moles of hydrofluoric acid and 0.77 moles of boron tri-fluoride were added, and after raising the temperature to 100, at spontaneously generated pressure, the reaction was conducted at 100° C. for 4 hours. Next, by the usual methods, HF and $BF_3$ were removed and recycled by flushing the autoclave with nitrogen gas and after the low boiling components were removed, and an optically isotropic pitch with a softening point of 82° C. was obtained. To 15 grams of the pitch thus obtained and placed in a 200 ml glass flask were added 15 grams of furfural (mixing ratio: 50/50) and after 1 hour of blending these components evenly by stirring at 100° C., 1.5 grams of paratoluenesulfonic acid were added and the mixture was stirred for a further 10 minutes at 100° C. and a gel-like solid was obtained. This solid was heated to 450° C. under a flow of nitrogen gas, and unreacted furfural and other volatile components were driven off. Then, the processed material thus obtained was ground to an average particle diameter of 15 μm; and, then, while under a small flow of nitrogen, the material was calcined for 2 hours at a reduced pressure of 10 torr at 1200° C. to obtain a powdered carbonaceous material. Test anodes were made of the carbonaceous material thus obtained, and these were evaluated in the same way as in Example 1. The conditions of preparation and the results are given in Table 1.

EXAMPLES 7–10

Thirty grams of the naphthalene raw material of Example 6 was mixed with furfural in ratios of 20/80, 30/70, 40/60, and 60/40 and then subjected to the identical procedures and conditions as in Example 6. Then, half cells made with the resulting anode material were evaluated in the same way as in Example 1. The conditions of preparation and the results are given in Table 1.

EXAMPLE 11

To fifteen grams of isotropic coal tar pitch were added 15 grams of furfural in a 200 ml glass flask (mixing ratio: 50/50) and were mixed evenly by stirring for 1 hour at 100° C., after which 1.5 grams of paratoluenesulfonic acid was added and stirring was continued at 100° C. to obtain a gel-like solid. This solid was then heated to 450° C. under a flow of nitrogen and all unreacted furfural and other volatile components were removed. The processed material thus obtained was ground to an average particle diameter of 15 μm; and, then, while under a small flow of nitrogen, the material was calcined for 2 hours at a reduced pressure of 10 torr at 1200° C. to obtain a powdered carbonaceous material. Test anodes were made and evaluated in the same way as in Example 1. The conditions of preparation and the results are given in Table 1.

EXAMPLE 12

Into a heat resistant autoclave, 7 moles of naphthalene, 2.45 moles of hydrofluoric acid and 0.77 moles of boron tri-fluoride were added, and after raising the temperature to 260° C., at spontaneously generated pressure, the reaction was conducted at 260° C. for 4 hours. Next, by the usual methods, HF and $BF_3$ were removed and recycled by flushing the autoclave with nitrogen gas and then the low boiling components were removed and a 100% optically anisotropic pitch with a softening point of 230° C. was obtained. To 9 grams of the pitch thus obtained were added 21 grams of furfural (mixing ratio: 30/70) in a 200 ml glass flask and after 1 hour of blending these components evenly by stirring at 100° C., 1.5 grams of paratoluenesulfonic acid were added and the mixture was stirred a further 10 minutes at 100° C. and a gel-like solid was obtained. This solid was heated to 450° C. under a flow of nitrogen gas, and unreacted furfural and other volatile components were driven off. Then the processed material thus obtained was ground to an average particle diameter of 15 μm; and, then, while under a small flow of nitrogen, the material was calcined for 2 hours at a reduced pressure of 10 torr at 1200° C. to obtain a powdered carbonaceous material. Test anodes were made and evaluated in the same way as in Example 1. The conditions of preparation and the results are given in Table 1.

COMPARATIVE EXPERIMENT 1

Thirty grams of the ethylene bottom oil used in Example 1 were stirred at 100 and 1.5 grams of paratoluenesulfonic acid were added and stirring was continued for 1 hour at 100° C. Then, the temperature was raised to 600° C. under a flow of nitrogen; and a solid was obtained. The processed material thus-obtained then was ground to an average particle diameter of 15 μm; and, while under a small flow of nitrogen, the material was calcined for 2 hours at a reduced pressure of 10 torr at 1200° C. to obtain a powdered carbonaceous material. Test anodes were made and evaluated in the same way as in Example 1. The conditions of preparation and the results are given in Table 1.

COMPARATIVE EXPERIMENT 2

Thirty grams of the isotropic pitch obtained in Example 6 were stirred at 200° C. and 1.5 grams of paratoluenesulfonic acid were added. Stirring of this mixture was continued for 1 hour at 200° C., after which the temperature was raised to 600° C. under a flow of nitrogen gas and a solid was obtained. Then, the processed material thus obtained was ground to an average particle diameter of 15 μm; and, while under a small flow of nitrogen, the material was calcined for 2 hours at a reduced pressure of 10 torr at 1200° C. to obtain a powdered carbonaceous material. Test anodes were made and evaluated in the same way as in Example 1. The conditions of preparation and the results are given in Table 1.

COMPARATIVE EXPERIMENT 3

To thirty grams of furfural in a 200 ml glass flask at 100° C. were added 1.5 grams of paratoluenesulfonic acid. Stirring of this mixture was continued to obtain a solid. This solid was heated at 450° C. under nitrogen to drive off any unreacted furfural or any other volatile components. Then, the processed material thus obtained was ground to an average particle diameter of 15 μm; and, while under a small flow of nitrogen, the material was calcined for 2 hours at a reduced pressure of 10 torr at 1200° C. to obtain a powdered carbonaceous material. Test anodes were made and evaluated in the same way as in Example 1. The conditions of preparation and the results are given in Table 1.

Table 1 below sets forth the preparation conditions and anode properties of the carbonaceous materials shown by Example and Comparative Experiment Numbers:

TABLE 1

| | Raw Material[1] | Mixing Ratio[2] | Charge Capacity mAh/g | Discharge Capacity mAh/g | Irreversible Capacity Loss mAh/g |
|---|---|---|---|---|---|
| Example 1 | Ethylene Bottom Oil | 50/50 | 692 | 599 | 93 |
| Example 2 | Ethylene Bottom Oil | 20/80 | 690 | 562 | 128 |
| Example 3 | Ethylene Bottom Oil | 30/70 | 694 | 585 | 109 |
| Example 4 | Ethylene Bottom Oil | 40/60 | 704 | 604 | 100 |
| Example 5 | Ethylene Bottom Oil | 60/40 | 667 | 585 | 82 |
| Example 6 | Isotropic Pitch | 50/50 | 598 | 518 | 80 |
| Example 7 | Isotropic Pitch | 20/80 | 681 | 568 | 113 |
| Example 8 | Isotropic Pitch | 30/70 | 675 | 573 | 102 |
| Example 9 | Isotropic Pitch | 40/60 | 634 | 543 | 91 |
| Example 10 | Isotropic Pitch | 60/40 | 598 | 518 | 80 |
| Example 11 | Coal Tar Pitch | 50/50 | 662 | 558 | 104 |
| Example 12 | Anisotropic Pitch | 30/70 | 576 | 500 | 76 |
| Comparative Example 1 | Ethylene Bottom Oil | 100/0 | 305 | 272 | 33 |
| Comparative Example 2 | Isotropic Pitch | 100/0 | 344 | 303 | 41 |
| Comparative Example 3 | Furfural | 0/100 | 666 | 447 | 219 |

1) The raw material with which furfural is mixed, except for Comparative Example 3 where furfural by itself was used.
2) Ratio of tar and/or pitch to furfural.

As can be seen from these Examples, the present invention provides anode materials that achieve lithium secondary batteries having improved discharge capacity in which the irreversible capacity loss in the first cycle is relatively low. Accordingly, in contrast to the prior art, the present invention provides secondary batteries having a relatively large capacity without the significant irreversible capacity loss in the first cycle typically resulting from the use of prior art anode materials. While the invention is susceptible of various modifications and alternative forms, specific embodiments thereof have been described in detail. It should be understood, however, that it is not intended to limit the invention to the particular forms disclosed, but, on the contrary, the intention is to cover all modifications, equivalents and alternatives falling within the spirit and scope of the invention as expressed in the appended claims. More particularly, while the present invention has been illustrated as an anode material in lithium secondary batteries, it should be appreciated that the present invention is applicable to use as the anode material in any battery where the attributes of the anode material find applicability.

We claim:

1. A method of preparing a carbonaceous material anode for a secondary battery consisting essentially of providing a mixture of a member selected from the group consisting of tar, pitch, and mixtures thereof, with furfural in the presence of an acid catalyst, heating said mixture to obtain a solid, and calcining the solid to obtain the carbonaceous material anode.

2. The method of claim 1 wherein calcining is carried out at a temperature of at least 800° and the solid is obtained by heating about 10 parts by weight of tar per about 0.1 to 1000 parts by weight of furfural.

3. The method of claim 2 wherein the furfural amount is from about 1 to 100 parts by weight.

4. The method of claim 1 wherein the calcining is carried out at a temperature of at least 800° C. and the tar is a by-product of naphtha cracking.

5. The method of claim 1 wherein the calcining is carried out at temperature of at least 800° C. and the pitch is an optically isotropic pitch.

6. The method of claim 5 wherein the solid is obtained by heating about 10 parts by weight of th optically isotropic pitch per about 5 to 100 parts by weight of furfural.

7. The method of claim 1 wherein the pitch is an optically anisotropic pitch and the solid is obtained by heating about 10 parts by weight of pitch per about 0.2 to 1000 parts by weight of furfural.

8. The method of claim 7 wherein the solid is obtained by heating about 10 parts by weight of the optically anisotropic pitch mixed with between about 10 to 100 parts by weight of furfural.

9. The method of claim 1 wherein the calcining is carried out at a temperature of at least 800° C. and wherein the pitch is obtained by reacting polycyclic hydrocarbons or mixtures containing polycyclic hydrocarbons in the presence of hydrofluoric acid and boron trifluoride or a derivative of such pitch.

10. The method of claim 7 wherein the furfural amount is from about 5 to 100 parts by weight of furfural.

* * * * *